(12) United States Patent
Winkelhake (10) Patent No.: US 10,851,766 B2
(45) Date of Patent: Dec. 1, 2020

(54) ACTUATOR AND CONNECTION ELEMENT

(71) Applicant: component engineering services GmbH, Gifhorn (DE)

(72) Inventor: Bernd Winkelhake, Gifhorn (DE)

(73) Assignee: component engineering services GmbH, Gifhorn (DE)

( * ) Notice: Subject to any disclaimer, the term of this patent is extended or adjusted under 35 U.S.C. 154(b) by 0 days.

(21) Appl. No.: 16/336,050

(22) PCT Filed: Mar. 22, 2018

(86) PCT No.: PCT/EP2018/057354
§ 371 (c)(1),
(2) Date: Mar. 22, 2019

(87) PCT Pub. No.: WO2018/172482
PCT Pub. Date: Sep. 27, 2018

(65) Prior Publication Data
US 2020/0003190 A1 Jan. 2, 2020

(30) Foreign Application Priority Data
Mar. 22, 2017 (DE) .................. 10 2017 106 220 U (51) Int. Cl.
*G05G 1/00* (2006.01)
*F03G 7/06* (2006.01)
(Continued)

(52) U.S. Cl.
CPC ............... *F03G 7/065* (2013.01); *F16C 1/08* (2013.01); *F16C 1/145* (2013.01); *F16G 11/02* (2013.01); *F16C 2326/01* (2013.01)

(58) Field of Classification Search
CPC .. F03G 7/065; F16G 11/02; F16C 1/08; F16C 1/145; F16C 2326/01
See application file for complete search history.

(56) References Cited

U.S. PATENT DOCUMENTS 6,834,836 B2 12/2004 Knowles et al.
2006/0145544 A1* 7/2006 Browne ................. H02N 2/023
310/306
(Continued)

FOREIGN PATENT DOCUMENTS

DE 202014000128 U1 3/2014
EP 2472112 A1 4/2012
(Continued)

OTHER PUBLICATIONS

English translation of International Search Report for International Patent Application PCT/EP2018/057354 with Written Opinion dated Jul. 20, 2018.

*Primary Examiner* — Jake Cook
(74) *Attorney, Agent, or Firm* — Brian B. Shaw, Esq.; Harter Secrest & Emery LLP (57) ABSTRACT

Actuator (100) for an adjustable component, in particular of a motor vehicle, comprising a wire (10) made of a shape memory alloy having a first end portion (11) and a second end portion (12) and extending in an axial direction (A) over a variable length (L); an actuating element (20) movable in the axial direction (A) between a first position (I) and a second position (II); a floating support (30) by which the wire (10) is movably supported in the axial direction (A); a fixed support (33) by which the wire (10) is fixedly disposed in the axial direction (A); at least one abutment (40, 45) connected to the floating support (30) or the fixed support (33) and provided with a through-opening (41, 46) for the wire (10) and a support surface (42, 47) adapted to transmit a force in the radial direction (R); and having at least one elastically deformable connecting element (60, 65) which has a receiving opening (61, 66) for the wire (10), which has a variable diameter ($D_{41}$, $D_{42}$) and in which the wire (10) is clamped in the region of the first end portion (11) or the second end portion (12), and a contact surface (62, 67)

(Continued)

which abuts against the support surface (42, 47) of the abutment (40, 45). By shortening the length (L) of the wire (10), a tensile force ($F_Z$) can be transmitted from the wire (10) to the connecting element (60, 65, 69) by means of which the actuating element (20) can be moved from the first position (I) into the second position (II) and the contact surface (62, 67) can be braced against the support surface (42, 47) in such a manner that a counterforce having a component acting in the radial direction (R) is applied to the connecting element (60, 65) by the abutment (40, 45), the counterforce reducing the diameter ($D_{A1}$, $D_{A2}$) of the receiving opening (61, 66) in order to retain the wire (10) in the connecting element (60, 65).

25 Claims, 7 Drawing Sheets

(51) Int. Cl.
  *F16C 1/08* (2006.01)
  *F16C 1/14* (2006.01)
  *F16G 11/02* (2006.01)

(56) References Cited

U.S. PATENT DOCUMENTS

| | | | |
|---|---|---|---|
| 2010/0092238 A1 | 4/2010 | Zavattieri et al. | |
| 2015/0330370 A1* | 11/2015 | Austen | F03G 7/06 60/529 |

FOREIGN PATENT DOCUMENTS

| | | | |
|---|---|---|---|
| GB | 2533159 A | 6/2016 | |
| WO | 2013/037446 A2 | 3/2013 | |

\* cited by examiner

ACTUATOR AND CONNECTION ELEMENT

TECHNICAL FIELD

The invention relates to a shape memory actuator for an adjustable component, in particular of a motor vehicle. Furthermore, the invention relates to an adjustable component, a method for connecting a wire to an elastically deformable connecting element and such a connecting element.

BACKGROUND OF THE INVENTION

Adjustable components of a motor vehicle include vehicle seats, fuel tank caps, mirrors or closing aids for tailgates. An adjustable component may be fitted with an actuator to automatically adjust the component and increase operator comfort. Actuators may have an electromagnetic operating principle, for example. In recent times, shape memory actuators have been increasingly used. One of the advantages of shape memory actuators is that they are comparatively light and quiet.

Shape memory actuators are based on the shape memory effect of shape memory alloys. The shape memory effect is based on a crystallographically reversible martensite-austenite phase transformation that can be thermally excited. After a deformation, elements made of a shape memory alloy can be formed back into a shape previously impressed by the shape memory effect. In addition, magnetic shape memory alloys are known to exhibit an additional, magnetically excitable shape memory effect.

The shape memory alloys known are, in particular, nickel-titanium alloys, but also alloys based on copper or iron. Magnetic shape memory alloys are ferromagnetic materials such as nickel-manganese-gallium alloys.

For example, an actuator with an actuating element made of shape memory material is disclosed in WO 2013/037446 A2. The cylindrical actuator has an actuating element made of wires of shape memory alloy. The wires form a grid structure. After mechanical deformation, the wires can be heated to form back into their original position due to the thermally activated shape memory effect.

U.S. Pat. No. 6,834,835 B1 discloses an extendable wing system in which an actuator having an actuating element made of a shape memory material that can be activated by means of heat is used.

DE 20 2014 000 128 U1 describes a device for fastening a Bowden cable to a force transmission element provided with an external thread and a conical contact surface, such as a screw eye. The device has a union nut that can be screwed onto the external thread of the force transmission element and a cutting ring provided with a conical ring inside. When the union nut is tightened against the contact surface of the force transmission element, the cutting ring receiving the Bowden cable in a central opening is subjected to a force in such a way that the cutting ring is compressed and the inside of the ring cuts into the Bowden cable to clamp it.

SUMMARY OF THE INVENTION

The invention is based on the task of creating an actuator that has an improved mechanical connection.

The task is solved by an actuator according to claim 1, by an adjustable component according to claim 14, by methods according to claims 15, 16 and 25 and by a connecting element according to claim 17. Advantageous embodiments of the actuator are the subject-matters of claims 2 to 13. Advantageous embodiments of the connecting element are the subject-matters of claims 18 to 24.

The actuator according to the invention comprises a wire made of a shape memory alloy having a first end portion and a second end portion and extending in an axial direction over a variable length; an actuating element movable in the axial direction between a first position and a second position; a floating support by which the wire is movably supported in the axial direction; a fixed support by which the wire is fixedly disposed in the axial direction; at least one abutment connected to the floating support or the fixed support and provided with a through-opening for the wire and a support surface adapted to transmit a force in the radial direction; and having at least one elastically deformable connecting element which has a receiving opening for the wire, which has a variable diameter and in which the wire is clamped in the region of the first end portion or the second end portion, and a contact surface which abuts against the support surface of the abutment, wherein by shortening the length of the wire the contact surface can be braced against the support surface and the actuating element can be moved from the first position into the second position.

When the shape memory effect of the wire's material is activated, the resulting phase transformation causes a deformation of the wire. The length of the wire is shortened to a previously imprinted length. Due to the shortening, the wire transmits a tensile force to the connecting element. The tensile force is transmitted via the contact surface of the connecting element and the support surface to the abutment and on to the floating support and/or the fixed support. The connecting element at the first end portion is moved towards the fixed support with the abutment and the floating support due to the tensile force. The actuating element is moved from the first position to the second position due to a corresponding connection.

The activation of the shape memory effect may be achieved thermally, for example. For this purpose, the wire may be directly exposed to heat. The wire can also be supplied with an electric current, so that due to the inherent resistance of the wire, heating takes place, which activates the shape memory effect. If a magnetic shape memory alloy is used, the shape memory effect may also be stimulated by applying a magnetic field.

The support surface of the abutment being adapted for transmitting a force in the radial direction, and the contact surface abutting against the support surface, the contact surface braces against the support surface when the length of the wire is shortened. The tensile force transmitted from the wire to the connecting element in the axial direction is absorbed as a result of the design of the support surface and the contact surface by the abutment in such a way that the latter exerts a counterforce on the connecting element with a component acting in the radial direction. The connecting element is compressed in the radial direction. The variable diameter of the receiving opening is reduced. Thus, when the tensile force caused by a shortening of the wire is applied, the retaining force which the connecting element exerts on the wire is automatically increased. This ensures that under load the wire is retained securely in the connecting element without causing damage or plastic deformation of the wire, as is the case with crimping, for instance. The damage-free connection of the wire to the connection element also improves the even heat distribution in the wire.

Advantageously, the wire is connected to the connecting element both at the first end portion and at the second end portion. Connection elements at both end portions allow, for example, an electric current to be applied to the wire at the connection elements.

Advantageously, the support surface and the contact surface are each conically shaped. A conical surface allows the abutment to exert the counterforce on the connecting element with the component acting in the radial direction. In addition, the connecting element may be further braced along the conical surface when a tensile force is applied to the connecting element by the wire, so that the counterforce of the abutment is increased.

Advantageously, the wire is connected to the connecting element both at the first end portion and at the second end portion. Connection elements at both end portions allow, for example, an electric current to be applied to the wire at the connection elements.

Preferably, the cross-section of the receiving opening is round, preferably circular, so that an even force transmission to the wire is achieved over the circumference. When electric current is applied to the wire, the electrical contact surface extends concentrically over the circumference of the wire. The electrical contact resistance is thus kept low.

In an advantageous embodiment, the abutment and the floating support and/or the abutment and the fixed support are designed in one piece. A one-piece design results in a simpler structure of the actuator.

Advantageously, the actuator comprises a fixed axial guide, which is provided with a through-opening for the wire and with an abutment surface. Preferably, the actuator has a pressure sheath surrounding the wire which is clamped between the fixed support and the abutment surface of the axial guide and is adapted to transmit a compressive force in the axial direction. The tensile force of the wire is then absorbed at the fixed support by the pressure sheath.

In an advantageous embodiment, the floating support and/or the fixed support have a receptacle for the pressure sheath. The position of the pressure sheath relative to the floating support or to the fixed support can be better defined in the receptacle. Preferably, the receptacle has a projection which is adapted to retain the pressure sheath on the floating support or the fixed support in the axial direction. This prevents the pressure sheath from being detached from the floating support or the fixed support.

Advantageously, the actuator has a return spring which is configured such that the actuating element can be moved from the first position into the second position against the action of the return spring. The return spring is preferably designed as a compression spring.

When the shape memory effect of the wire material is not activated, the compressive force exerted by the return spring on the floating support is transmitted to the wire via the abutment and the connecting element. This exerts a tensile force on the wire, which causes elongation and thus pseudoplastic deformation of the wire; the length of the wire is increased. The actuating element is thereby moved from the second position back to the first position.

In an advantageous embodiment, the actuating element is provided with a through-opening for the wire. Preferably the wire extends through the through-opening with a clearance in the radial direction. This allows for a compact design of the actuator while at the same time ensuring that the tensile force of the wire and the compressive force of the return spring counteract each other.

Advantageously, the connection element has a connection portion for electrical contacting. In this case, the shape memory effect can be activated by applying an electrical current.

Advantageously, the actuator comprises a heat-insulating inner tube which at least partially surrounds the wire. The better insulation allows the wire to be heated evenly more quickly.

In an advantageous embodiment, the actuator comprises a housing to accommodate the actuating element and/or the floating support and/or the axial guide. Preferably, the housing is provided with at least one fixing projection.

Advantageously, the return spring is arranged in the housing and clamped between the axial guide and the actuating element.

An advantageous embodiment, the actuating element is provided with a receptacle for a Bowden cable, which has an inner cable and a Bowden cable housing. Preferably, the receptacle is configured to be connected to the inner cable in a form-fitting manner. By moving the actuator from the first position to the second position and back, the Bowden cable can adjust the adjustable component. The receptacle represents a uniform interface for adjustable components which may be provided with a Bowden cable. This results in an extremely wide field of application for the actuator.

Advantageously, the actuator has a guide part for the Bowden cable which is attached to the housing and has a through-opening for the inner cable and a stop surface for the Bowden cable housing. The guide part is preferably provided with a groove into which at least one fixing projection engages in a form-fitting manner.

The adjustable component according to the invention comprises the actuator by means of which the adjustable component can be adjusted.

The method according to the invention is used to connect a wire, which has a diameter and extends in an axial direction, to a connecting element of the actuator, which is elastically deformable in the axial direction, the connecting element having a receiving opening for the wire which has a variable diameter and into which the wire is clampable. In the method, the connecting element is first compressed in the axial direction in order to enlarge the receiving opening from a first diameter to a second diameter that is larger than the diameter of the wire. The wire is then inserted into the receiving opening when the second diameter of the receiving opening is reached. Finally, the connecting element is released in the axial direction in order to reduce the receiving opening from the second diameter to the first diameter.

In another method of connecting a wire having a diameter and extending in an axial direction to an elastically deformable connecting member of the actuator having a receiving opening for the wire which has a variable diameter and in into which the wire is clampable, the connecting member is first heated to enlarge the receiving opening from a first diameter to a second diameter that is larger than the diameter of the wire. The wire is then inserted into the receiving opening when the second diameter of the receiving opening is reached. Finally, the connecting element is cooled in order to reduce the receiving opening from the second diameter to the first diameter. The connecting element is then shrunk onto the wire to provide a transverse press-fit.

The processes do not involve plastic deformation of the connecting element and the wire, as is the case with crimping, for instance. This prevents damage to the wire and the connecting element. At the same time, improved heat distribution in the wire is achieved.

According to the invention, the connecting element for a wire made of a shape memory alloy of an actuator for an adjustable component comprises a clamping wedge which has a receiving opening extending in the axial direction for the wire and a lateral surface provided with at least one clamping portion. The connecting element further comprises a sleeve which can be fitted onto the clamping wedge and which has a through-opening extending in the axial direction and an inner surface provided with at least one clamping portion. Furthermore, the connecting element comprises a press bushing which is coupled with or connected to the clamping wedge and has a cavity accommodating the wire and a wall which can be plastically deformed in the radial direction and is provided with an inner surface. By plastic deformation of the wall, a first clamping force is exerted on the wire at at least one retaining portion formed by the inner surface, the clamping force connecting the wire and the press bushing in a force-fitting manner. In addition, the clamping wedge and the sleeve are braced against one another by a tensile force generated in the axial direction in the wire in such a way that a second clamping force is exerted on the wire in the receiving opening of the clamping wedge, which additionally connects the wire and the clamping wedge to one another in a force-fitting manner.

The connecting element according to the invention is based on the realisation that the clamping force with which the wire is fixed to the connecting element is divided into an initial clamping force caused by the press bushing and an additional clamping force caused by the clamping wedge. The press bushing is plastically deformed with the aid of a tool so that the initial clamping force acts on the wire. The additional clamping force, which increases the force and thus ensures reliable fastening, is generated by the sleeve being pressed onto the clamping wedge by the tensile force in the wire.

In a preferred embodiment of the connecting element, the clamping wedge has a front end surface In a preferred embodiment of the connecting element, the clamping wedge has a front end face, when viewed in the axial direction, and is provided with at least one slot-shaped recess. Preferably, the recess extends in the axial direction and, further preferably, opens at the front end face. The deformability of the clamping wedge, in particular caused by the slot-shaped recess, ensures tolerance compensation and thus takes into account the inevitable manufacturing tolerances in the diameters of wire, clamping wedge and sleeve.

In a further preferred embodiment of the connection element according to the invention, the lateral surface of the clamping wedge and/or the inner surface of the sleeve each have at least one clamping portion tapering conically in the axial direction and/or at least one linear clamping portion. The clamping portion(s) of the clamping wedge cooperate with the corresponding clamping portions of the sleeve in order to reliably brace the clamping wedge and the sleeve against each other.

The press bushing and the clamping wedge may be designed in one piece. However, the press bushing and the clamping wedge are preferably designed as separate components. Preferably, the press bushing has a contact surface and the clamping wedge has a corresponding surface which abuts against the contact surface. The contact surface of the press bushing is pressed against the corresponding surface of the clamping wedge due to the tensile force in the wire.

The clamping wedge has a rear shoulder, when viewed in the axial direction, by which advantageously the corresponding surface is formed. The sleeve has a front end face, when viewed in the axial direction, and a rear end face, when viewed in the axial direction. Preferably, when the sleeve is mounted on the clamping wedge, the shoulder of the clamping wedge and the rear end face of the sleeve are spaced apart by a predetermined distance, which ensures unimpeded clamping of the sleeve and the clamping wedge. Furthermore, preferably when the sleeve is mounted on the clamping wedge, the front end face of the sleeve protrudes in the axial direction over the front end face of the clamping wedge causing the inner surface of the sleeve to form a protrusion. The protrusion allows the clamping portions to be selectively fixed to the inner surface of the sleeve and to the lateral surface of the clamping wedge.

BRIEF DESCRIPTION OF THE DRAWING FIGURES

In the following, the invention is described schematically on the basis of exemplary embodiments with reference to drawings. Shown in the drawings are.

DETAILED DESCRIPTION OF THE INVENTION

Figure 1:
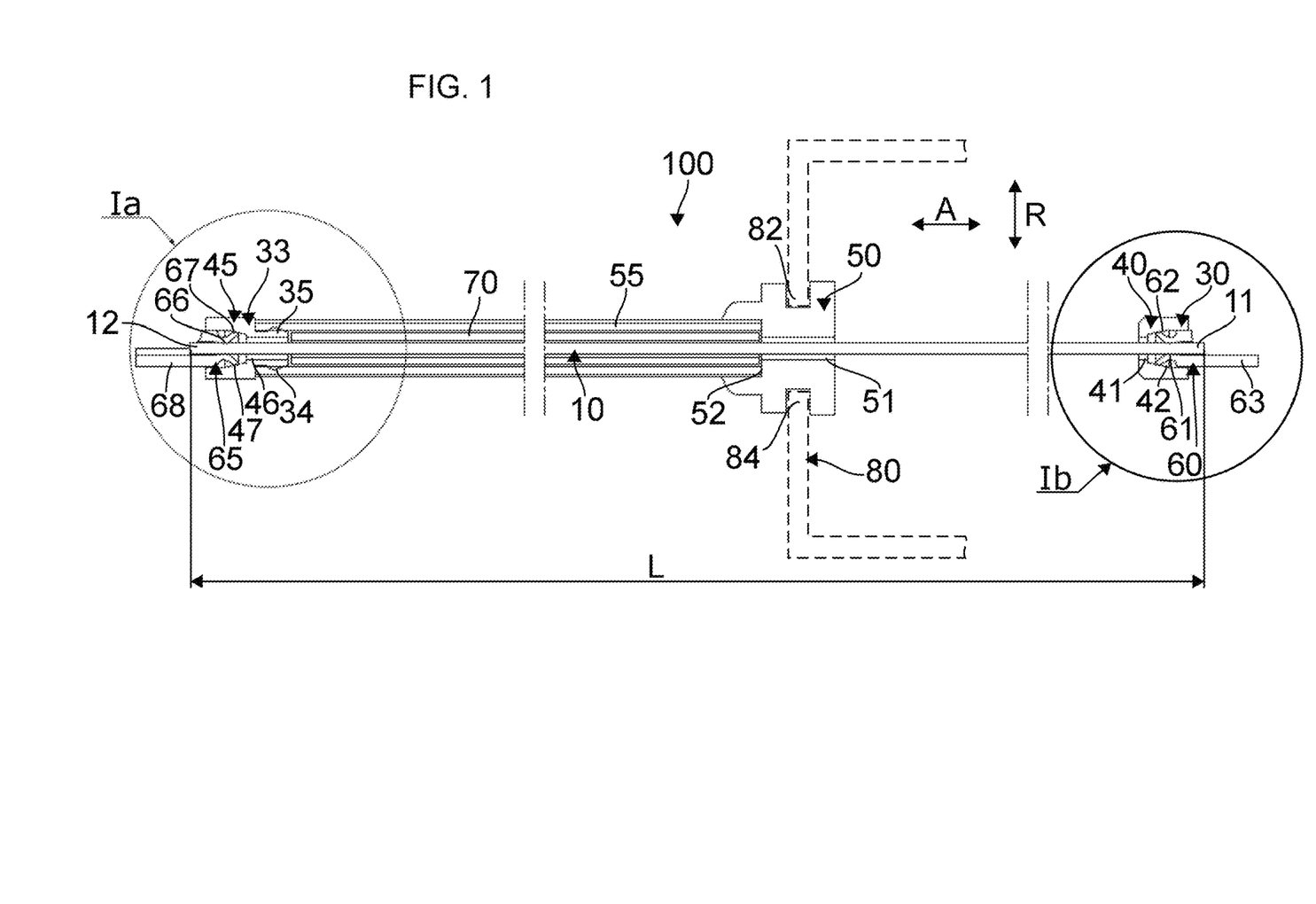
FIG. 1 is a sectional view of a first exemplary embodiment of the actuator according to the invention.
Figure 1A:
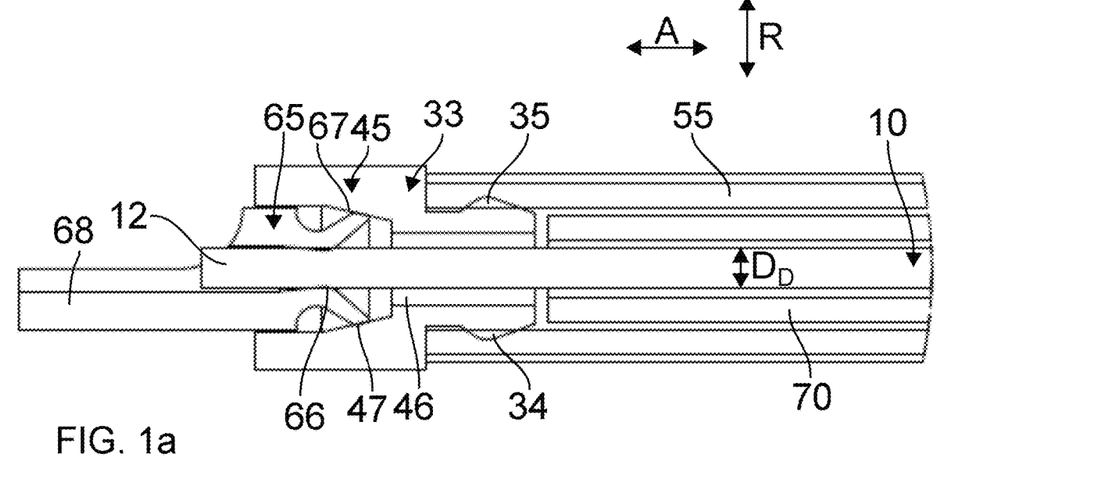
FIG. 1a is an enlarged sectional view according to the detail Ia from FIG. 1.

As FIG. 1 clearly shows, the actuator 100 for an adjustable component comprises a wire 10 made of a shape memory alloy. The wire 10 has a diameter $D_D$ which is illustrated in particular in FIGS. 1a to 1d, has a first end portion 11 and a second end portion 12 and extends in an axial direction A over a variable length L. The diameter $D_D$ of the wire is shown in FIGS. 1a to 1d. The axial direction A is usually linear. However, the wire 10 can also be arranged in such a way that it extends non-linearly so that the axial direction A also extends non-linearly.

Nickel-titanium alloys are particularly suitable as shape memory alloys. Magnetic shape memory alloys are ferromagnetic materials such as nickel-manganese-gallium alloys. When the shape memory effect is activated, the resulting phase transformation causes a deformation of the wire 10. The length L of the wire 10 is reduced to a previously imprinted length.

The shape memory effect can be thermally activated by applying heat directly to the wire 10. Furthermore, an electric current can be applied to the wire 10 so that the wire 10 heats up due to its inherent resistance.

Figure 1B:
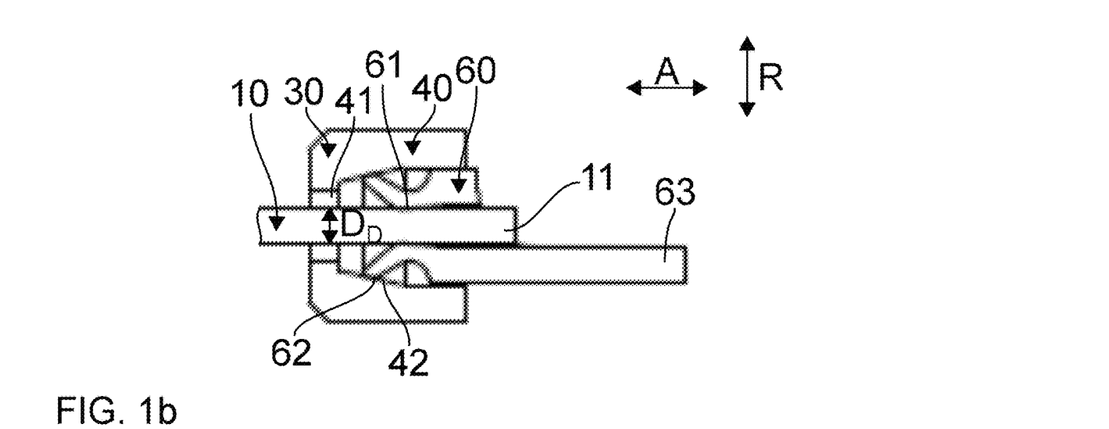
FIG. 1b is an enlarged sectional view according to the detail Ib from FIG. 1.
Figure 1C:
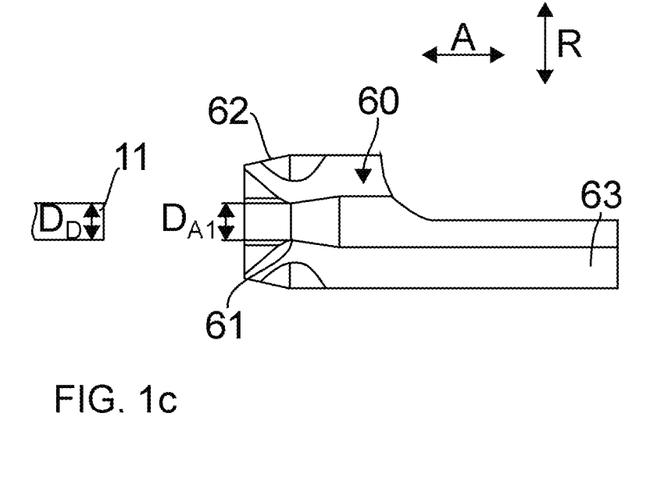
FIG. 1c is an enlarged sectional view of a connecting member.
Figure 1D:
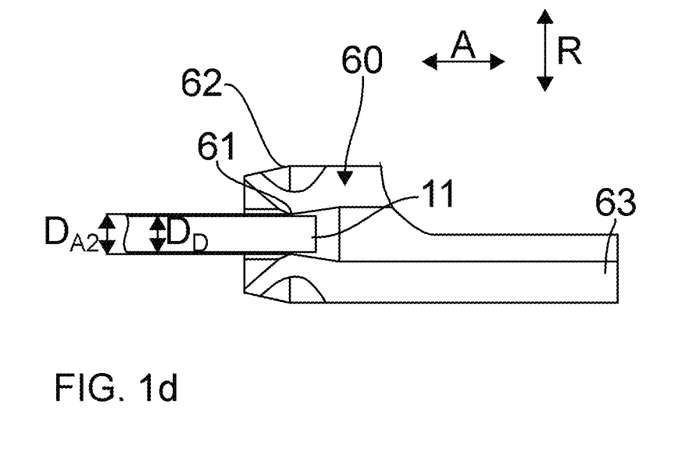
FIG. 1d is an enlarged sectional view of a connecting member from FIG. 1c in which the diameter of the receiving opening is enlarged.

As particularly clearly illustrated in FIG. 1b, the wire 10 is clamped in the region of the first end portion 11 in a receiving opening 61 of an elastically deformable connecting element 60. The receiving opening 61 is preferably round, more preferably circular, and has a variable diameter $D_{A1}$, $D_{A2}$, as shown in FIGS. 1c and 1d, in particular. As can be seen from FIGS. 1, 1a, the wire 10 can also be clamped at the second end portion 12 in a receiving opening 66 of an elastically deformable connecting element 65.

The actuator 100 comprises at least one abutment 40, 45 having a through-opening 41, 46 for the wire 10 and a support surface 42, 47. The support surface 42, 47 is adapted to transmit a force in the radial direction R. The at least one abutment 40, 45 is connected to a floating support 30, by means of which the wire 10 is supported movably in the axial direction A, or to a fixed support 33, by means of which the wire 10 is fixedly arranged in the axial direction A. As shown in FIG. 1, for example, the abutment 40, 45 can be designed in one piece with the floating support 30 and/or with the fixed support 33.

In the exemplary embodiments shown, the wire 10 extends through a through-opening 51 of a fixed axial guide 50. The axial guide 50 has an abutment surface 52 for a pressure sheath 55. The pressure sheath 55 surrounds the wire 10, is configured to transmit a compressive force in the axial direction A and is clamped between the fixed support 33 and the support surface 52 of the axial guide 50. The compression sleeve 55 may be at least partially designed as a compression spring. As shown in particular in FIGS. 2a and 2b, the axial guide 50 can be fixed to a housing 80. For this purpose, the housing 80 may have fixing projections 82, 84 to which the axial guide 50 can be fixed.

The connecting elements 60, 65 each have a contact surface 62, 67 which abuts against the support surface 42, 47 of the abutment 40, 45. The support surface 42, 47 and the contact surface 62, 67 can in particular have a conical design. When the wire 10 is shortened, this causes a tensile force on the connecting element 60, 65. The connecting element 60, 65 slides with the contact surface 62, 67 along the support surface 42, 47 of the abutment 40, 45. Thereby, the connecting element 60, 65 and the abutment 40, 45 are braced against each other. The abutment 40, 45 exerts a counterforce with a radial component onto the connecting element 60, 65. The connecting element 60, 65 is compressed in the radial direction by the counterforce. As a result, when the wire 10 exerts a tensile force on the connecting element 60, 65, it is securely retained in the connecting element 60, 65.

In addition, the connection elements may have 60, 65 connection portions 63, 68 for electrical contacting. As a result, the wire 10 can be supplied with an electrical current via the connection elements 60, 65. In this case in particular, the connection elements 60, 65 may consist of a copper alloy, for example of brass or bronze.

The floating support 30 and/or the fixed support 33 may have a receptacle 34 for the pressure sheath 55. As shown in particular in FIG. 1, 1a, the receptacle 34 may have a projection 35. The projection 35 is adapted for retaining the pressure sheath 55 on the floating support 30 or the fixed support 33 in the axial direction A.

Figure 2A:
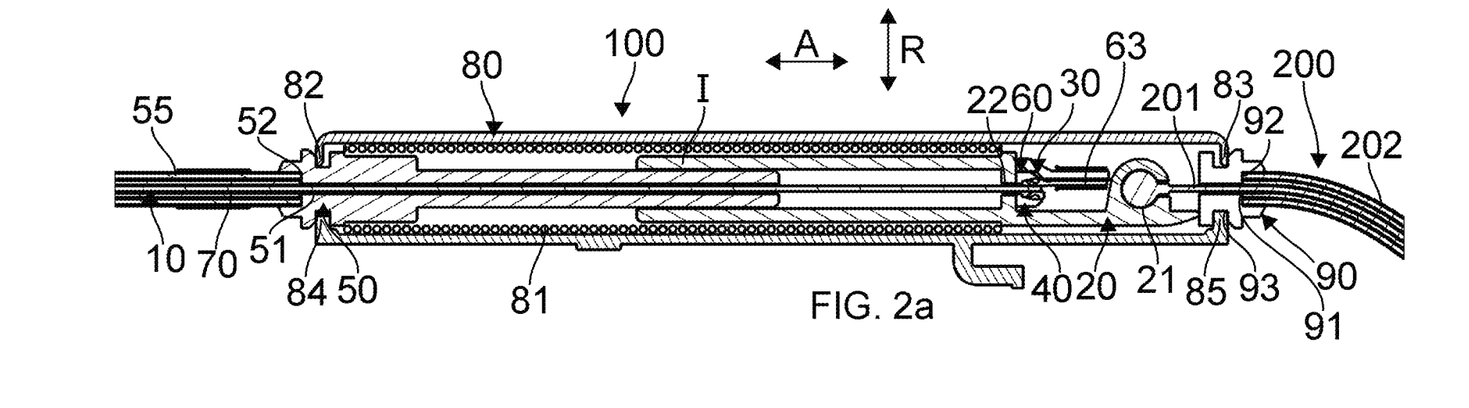
FIG. 2a is a sectional view of a second exemplary embodiment of the actuator in which the actuating element is shown in the first position.
Figure 2B:
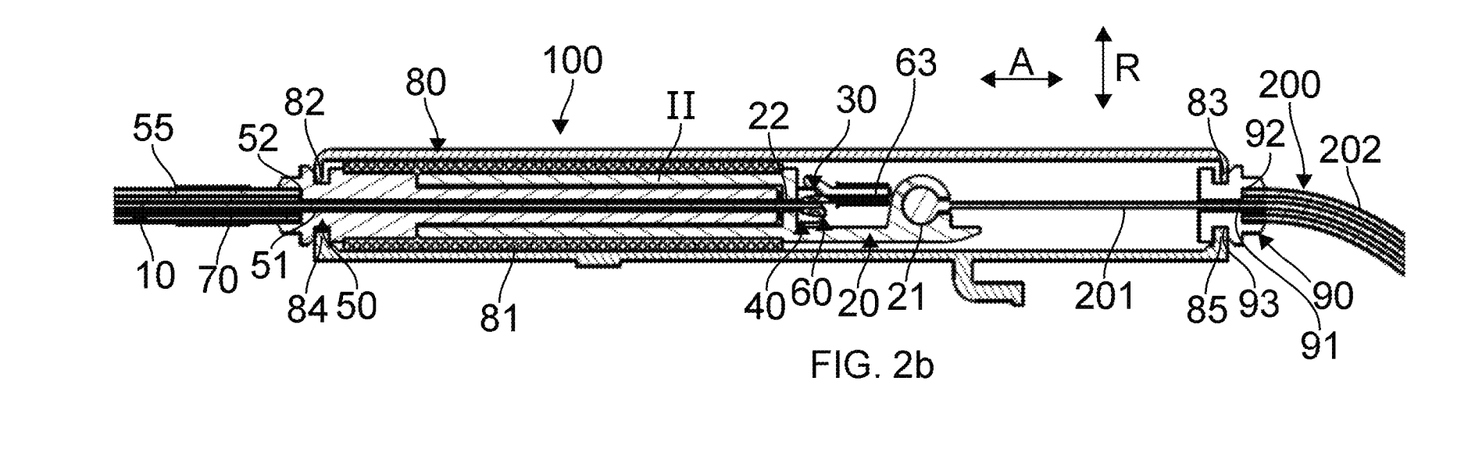
FIG. 2b is a sectional view of the actuator in which the actuating element is shown in the second position.
Figure 2C:
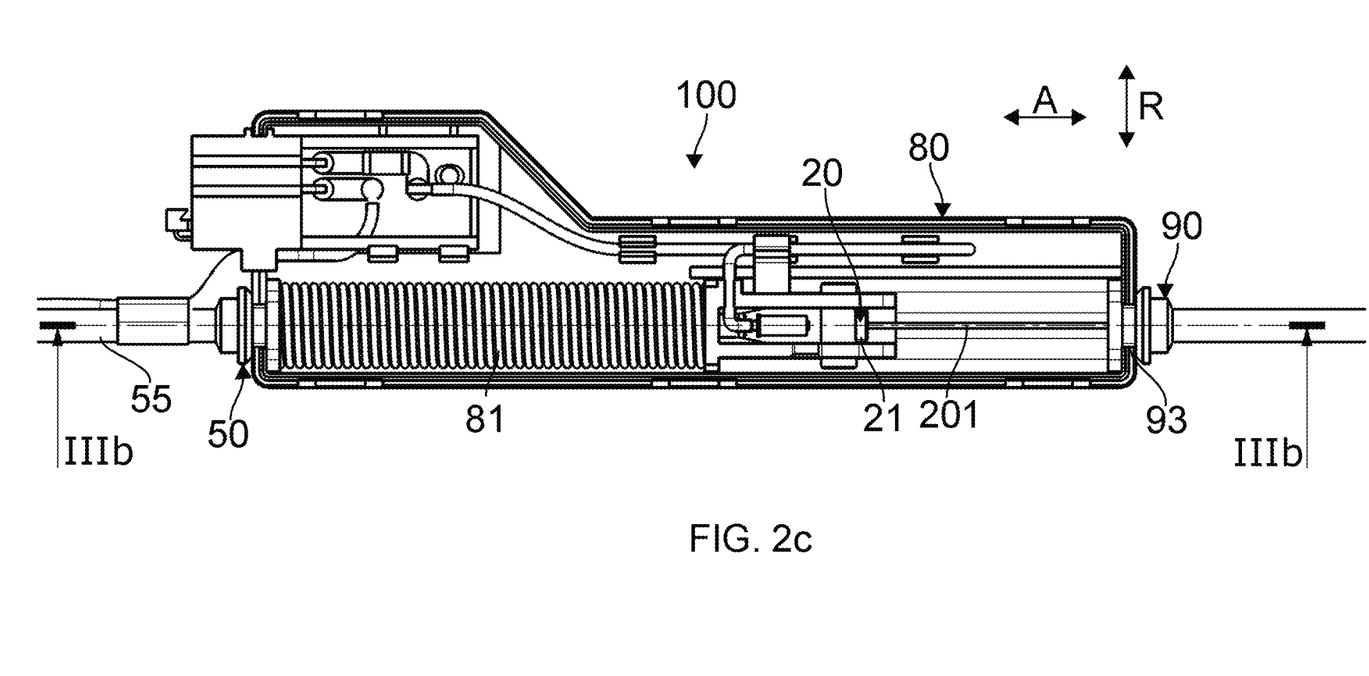
FIG. 2c is a top view of the exemplary embodiment according to FIGS. 2a and 2b with the housing cover removed.

As FIG. 2a to 2c illustrate, the actuator 100 has one actuating element 20 (not shown in FIG. 1). The actuating element 20 is movable in the axial direction A between a first position I and a second position II.

The actuator 20 is connected in such a manner that it is moved from the first position I shown in FIG. 2a to the second position II shown in FIG. 2b by reducing the length L of the wire 10. When the shape memory effect is activated and the wire 10 is shortened, the wire 10 exerts a tensile force on the connecting elements 60, 65. The tensile force is transmitted via the contact surface 62 of the connecting element 60 and the support surface 42 to the abutment 40 and on to the floating support 30. Thus, the connecting element 60, the abutment 40 and the floating support 30 are moved towards the fixed support 33. Thereby, the actuating element 20 is moved from the first position I to the second position II.

The wire 10 may be surrounded by a return spring 81. The return spring 81 counteracts a movement of the actuating element 20 from the first position I to the second position II and moves the actuating element 20 from the second position II to the first position I. For example, the return spring 81 can exert a restoring force on the actuating element 20 and/or the floating support 30 for this purpose. When the shape memory effect of the wire 10 material is not activated, the compressive force exerted by the return spring 81 on the actuating element 20 and/or the floating support 30 is transmitted via the abutment 40 and via the connecting element 60 to the wire 10. This causes a tensile force to act on the wire 10 which causes elongation and thus pseudoplastic deformation of the wire 10; the length L of the wire 10 is increased. The actuating element 20 is moved from the second position II back to the first position I.

The actuating element 20 may have a receptacle 21 for the Bowden cable 200. In this case, the Bowden cable 200 is moved from the first position I to the second position II and back together with the actuating element 20 during a movement of the actuator 20 and can adjust the adjustable component. In particular, the Bowden cable 200 has an inner cable 201 and a Bowden cable housing 202. In particular, the receptacle 21 may be configured in such a way that it can accommodate the inner cable 201 in a form-fitting manner.

The actuating element 20 may be provided with a through-opening 22 for the wire 10. The wire 10 may in particular extend through the through-opening 22 with a clearance R in the radial direction.

Particularly in shape memory alloys in which the shape memory effect is thermally activated, the wire 10 may be at least partially surrounded by a thermally insulating inner tube 70. The inner tube 70 improves the insulation of the wire 10, resulting in faster and more uniform heat distribution in the wire 10.

The actuating element 20, the floating support 30 and/or the axial guide 50 may be accommodated in the housing 80. In addition, the return spring 81 may be arranged in the housing 80. For example, the wire 10 may be fed into the housing 80 from the outside, as shown in FIG. 2a, 2b in particular. The Bowden cable 200, in particular the inner cable 201 of the Bowden cable 200, may be fed from the receptacle 21 of the actuating element 20 out of the housing 80 to the outside and extend in particular through a through-opening 91 of a guide part 90. Furthermore, the guide part 90 may have in particular a stop surface 92 for the Bowden cable housing 202.

The housing 80 may have further fixing projections 83, 85 for fixing the guide 90, which may engage in a groove 93 in the guide 90.

In order to connect the wire 10 with the connecting element 60, 65, the connecting element 60, 65 is first compressed in the axial direction A in order to enlarge the receiving opening 61, 66 from a first diameter $D_{A1}$ to a second diameter $D_{A2}$ which is larger than the diameter $D_D$ of the wire 10, see in particular FIGS. 1c, 1d. The wire 10 is inserted into the receiving opening 61, 66 when the second diameter $D_{A2}$ of the receiving opening 61, 66 is reached. Then the connecting element 60, 65 is released in the axial direction A in order to reduce the receiving opening 61, 66 from the second diameter $D_{A2}$ to the first diameter $D_{A1}$.

Alternatively, the connecting element 60, 65 may also be connected to the wire 10 by shrinking. For this purpose, the connecting element 60, 65 is heated in order to enlarge the receiving opening 61, 66 from the first diameter $D_{A1}$ to the second diameter $D_{A2}$. The wire 10 is inserted into the receiving opening 61, 66 when the second diameter $D_{A2}$ of the receiving opening 61, 66 is reached. Then the connecting element 60, 65 is cooled down in order to reduce the receiving opening 61, 66 from the second diameter $D_{A2}$ to the first diameter $D_{A1}$. The method described in this way provides a transverse press-fit between the connecting element 60, 65 and the wire 10.

By avoiding plastic deformation of the connecting element 60, 65 and the wire 10, as is the case with crimping, damage to the wire 10 and the connecting element 60, 65 is prevented. As a result, heat distribution in the wire is better than in crimped connections. In addition, an even force transmission over the circumference of the wire 10 is achieved. The electrical contact surface of the wire 10 extends concentrically over the circumference of the wire. The electrical contact resistance is thus kept low.

The actuators 100 according to the exemplary embodiments illustrated here have in common that by shortening the length L of wire 10 the contact surface 62, 67 can be braced against the support surface 42, 47. This results in an improved mechanical connection of the wire 10 to the connecting elements 60, 65.

Figure 3A:
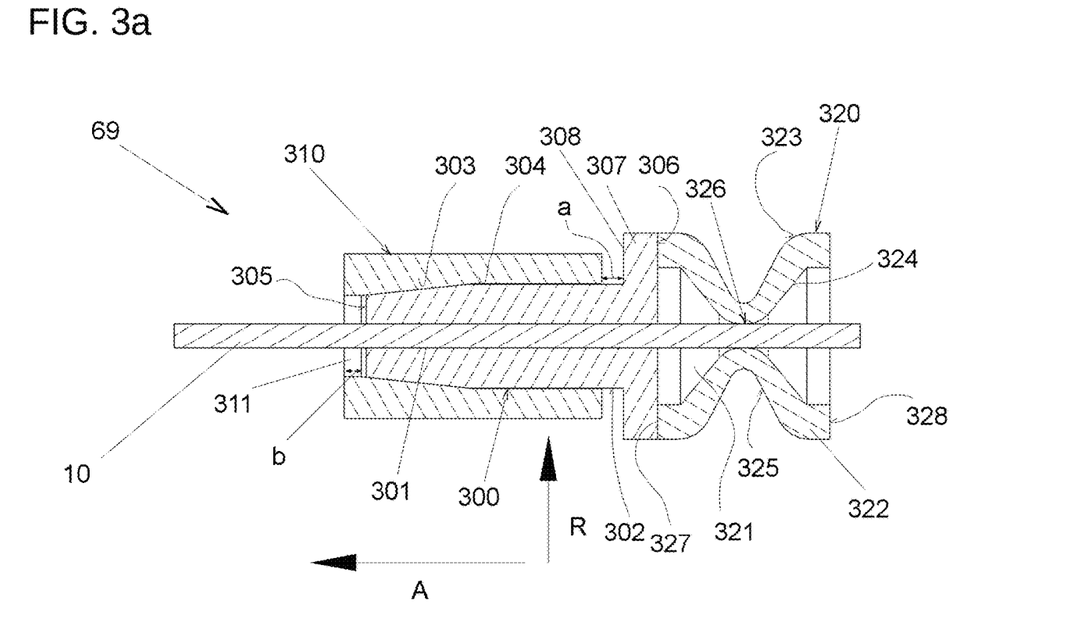
FIG. 3a is a sectional view of the connection element according to the invention.
Figure 3B:
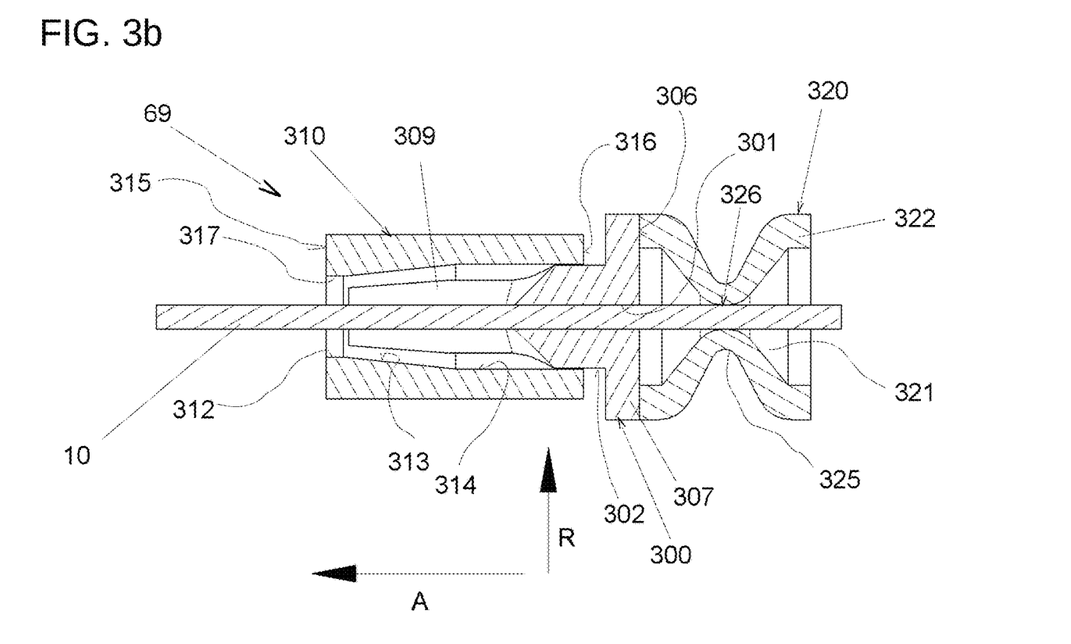
FIG. 3b is a further sectional view of the connection element according to the invention, indicating a slot-shaped recess.
Figure 4:
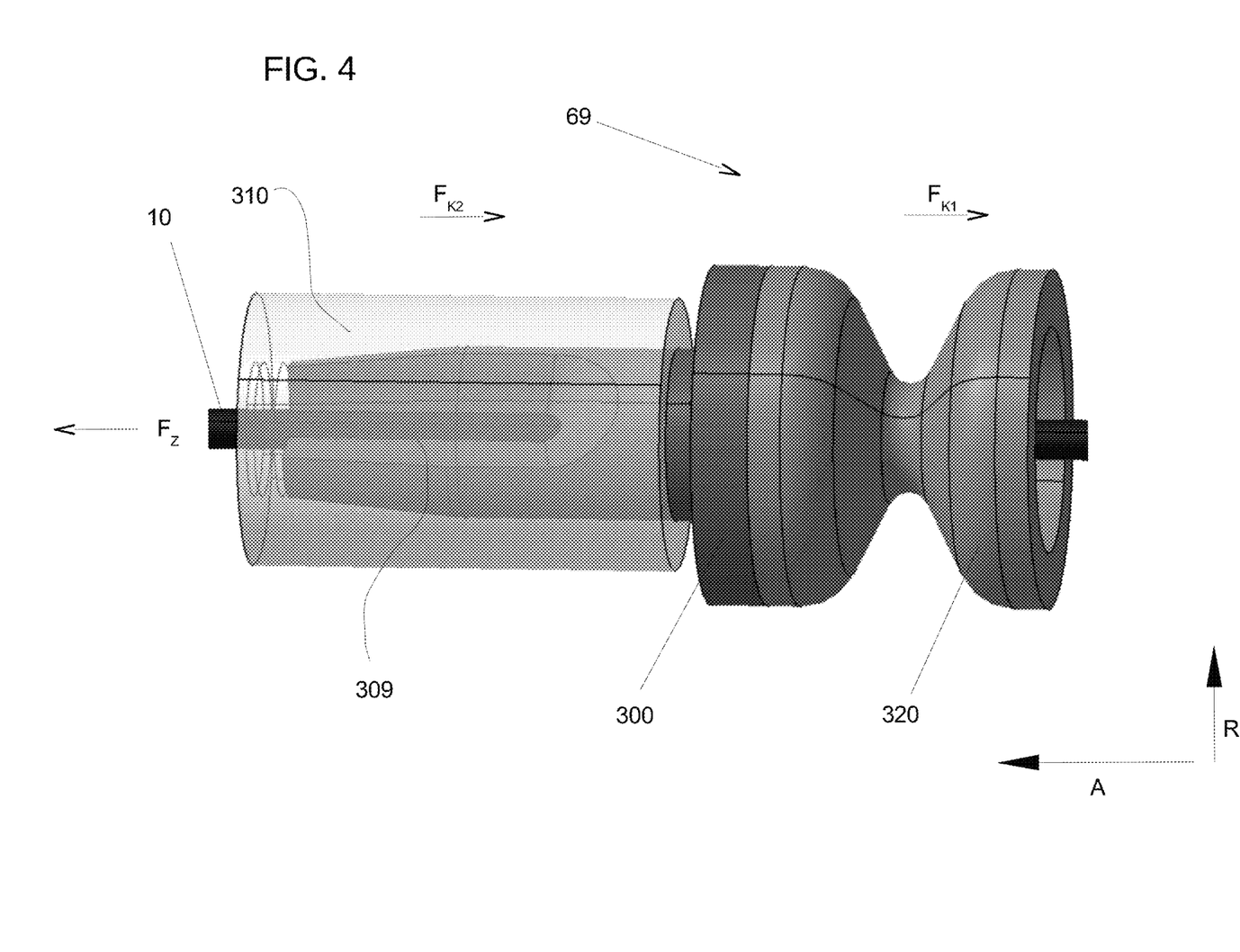
FIG. 4 is a perspective view of the connection element according to the invention.

FIGS. 3a, 3b and 4 show a particularly practical design of the connecting element 69 which can be used for the actuator 100 described above. The connecting element 69 comprises a clamping wedge 300 which has a receiving opening 301 extending in the axial direction A for the wire 10 and a lateral surface 302 provided with clamping portions 303, 304. The connecting element 69 further comprises a sleeve 310 which can be fitted onto the clamping wedge 300 and which has a through opening 311 extending in the axial direction A and an inner surface 312 provided with clamping portions 313, 314. Furthermore, the connecting element 69 comprises a press bushing 320 coupled or connected to the clamping wedge 300, the press bushing 320 having a cavity 321 receiving the wire 10, and a wall 322 plastically deformable in the radial direction R and provided with an inner surface 324. By plastic deformation of the wall 322, for instance in the form of a compression or dent 325, a first clamping force $F_{K1}$ is generated in the wire (10) at at least one retaining portion 326 formed by the inner surface 324, the clamping force $F_{K1}$ connecting the wire (10) and the press bushing (320) in a force-fitting manner. In addition, the clamping wedge 300 and the sleeve 310 are braced against one another by a tensile force $F_Z$ caused in the wire 10 in the axial direction A in such a way that a second clamping force $F_{K2}$ is exerted on the wire 10 in the receiving opening 301 of the clamping wedge 300, the second clamping force $F_{K2}$ additionally connecting the wire 10 and the clamping wedge 300 in a force-fitting manner to one another.

The clamping wedge 300 has a front end face 305 in axial direction A and is provided with a slot-shaped recess 309. The recess 309 extends, as can be seen in particular in FIGS. 2b and 3, in the axial direction A and opens out at the front end face 305. The deformation capability of the clamping wedge 300 caused by the slot-shaped recess 309 ensures tolerance compensation and thus takes account of the manufacturing tolerances inevitably occurring in practice in the diameter $D_D$ of the wire 10 and in the diameters of the clamping wedge 300 and sleeve 310 as well.

The lateral surface 302 of the clamping wedge 300 and the inner surface 312 of the sleeve 310 each have a clamping portion 303, 313 which tapers conically in the axial direction A and a linear clamping portion 304, 314. The clamping portions 303, 304 of the clamping wedge 300 interact with the corresponding clamping portions 313, 314 of the sleeve 310 to clamp the clamping wedge 300 and the sleeve 310 reliably against each other.

The press bushing 320 and the clamping wedge 300 are designed as separate components. The press bushing 320 has a front contact surface 327 in the axial direction A and a rear end face 328. The clamping wedge 300 has a corresponding surface 306 which abuts against the contact surface 327. The contact surface 327 of the press bushing 320 is pressed against the corresponding surface 306 of the clamping wedge 300 by the tensile force $F_Z$ in the wire 10.

The clamping wedge 300 has a rear shoulder 307 in the axial direction A, which forms the corresponding surface 306 and a shoulder 308 facing away from the corresponding surface 306. The sleeve 310 has a front end face 315, when viewed in the axial direction A, and a rear end face 316, when viewed in the axial direction. When the sleeve 310 is fitted on the clamping wedge 300, the shoulder 307 of the clamping wedge 300 and the rear end face 316 of the sleeve 310 are separated from each other by a predetermined distance a. Furthermore, when the sleeve 310 is fitted on the clamping wedge 300, the front end face 315 of the sleeve 310 projects in the axial direction A beyond the front end face 305 of the clamping wedge 300, so that the inner surface 312 of the sleeve 310 forms a projection b at a shoulder 317. The projection b and the shoulder 317 allow the clamping portions 313, 314 to be specifically fixed to the inner surface 312 of the sleeve 310 and the clamping portions 303, 304 to the lateral surface 302 of the clamping wedge 300.

LIST OF REFERENCE SIGNS

| | |
|---|---|
| 10 | wire |
| 11 | first end portion |
| 12 | second end portion |
| 20 | actuating element |
| 21 | receptacle |
| 22 | through-opening |
| 30 | floating support |
| 33 | fixed support |
| 34 | receptacle |
| 35 | projection |
| 40 | abutment |
| 41 | through-opening |
| 42 | support surface |
| 45 | abutment |
| 46 | through-opening |
| 47 | support surface |
| 50 | axial guide |
| 51 | through-opening |
| 52 | abutment surface |
| 55 | pressure sheath |
| 60 | connecting element |
| 61 | receiving opening |
| 62 | contact surface |
| 63 | connecting portion |
| 65 | connecting element |
| 66 | receiving opening |
| 67 | contact surface |
| 68 | connecting portion |
| 69 | connecting element |
| 70 | inner tube |

-continued

| | |
|---|---|
| 80 | housing |
| 81 | return spring |
| 82 | fixing projection |
| 83 | fixing projection |
| 84 | fixing projection |
| 85 | fixing projection |
| 90 | guide part |
| 91 | through-opening |
| 92 | stop surface |
| 93 | groove |
| 100 | actuator |
| 200 | Bowden cable housing |
| 201 | inner cable |
| 202 | Bowden cable housing |
| 300 | clamping wedge |
| 301 | receiving opening |
| 302 | lateral surface |
| 303 | conical clamping portion |
| 304 | rectilinear clamping portion |
| 305 | front end face |
| 306 | corresponding surface |
| 307 | shoulder |
| 308 | shoulder surface |
| 309 | slot-shaped recess |
| 310 | sleeve |
| 311 | through-opening |
| 312 | inner surface |
| 313 | conical clamping portion |
| 314 | rectilinear clamping portion |
| 315 | front end face |
| 316 | rear end face |
| 317 | shoulder |
| 320 | press bushing |
| 321 | cavity |
| 322 | wall |
| 323 | outer surface |
| 324 | inner surface |
| 325 | dent |
| 326 | retaining portion |
| 327 | contact surface |
| 328 | end face |
| I | first position |
| II | second position |
| a | distance |
| b | protrusion |
| A | axial direction |
| $D_{A1}$ | first diameter |
| $D_{A2}$ | second diameter |
| $D_D$ | diameter |
| $F_Z$ | tensile force |
| $F_{K1}$ | first clamping force |
| $F_{K2}$ | second clamping force |
| L | length |
| R | radial direction |

The invention claimed is:

1. An actuator for an adjustable component of a motor vehicle, comprising:
   a wire made of a shape memory alloy having a first end portion and a second end portion and extending in an axial direction over a variable length;
   an actuating element movable in the axial direction between a first position and a second position;
   a floating support by which the wire is movably supported in the axial direction;
   a fixed support by which the wire is fixedly disposed in the axial direction;
   at least one abutment connected to the floating support or the fixed support and provided with a through-opening for the wire and a support surface adapted to transmit a force in the radial direction (R); and
   having at least one elastically deformable connecting element having a receiving opening for the wire which has a variable diameter and in which the wire is clamped in the region of the first end portion or the second end portion, and the connecting element having a contact surface which abuts against the support surface of the abutment;
   wherein by shortening the length of the wire, a tensile force can be transmitted from the wire to the connecting element by means of which the actuating element can be moved from the first position into the second position and the contact surface can be braced against the support surface in such a manner that a counterforce having a component acting in the radial direction (R) is applied to the connecting element by the abutment, the counterforce reducing the diameter of the receiving opening in order to retain the wire in the connecting element.

2. The actuator according to claim 1, wherein the wire is connected at the first end portion and at the second end portion, respectively, to the connecting element.

3. The actuator according to claim 1 wherein the support surface and the contact surface are each cone-shaped and in that the receiving opening is round in cross-section.

4. The actuator according to claim 1, wherein the abutment and the floating support or the abutment and the fixed support are designed in one piece.

5. The actuator according to claim 1, in which a fixed axial guide which is provided with a through-opening for the wire and with a abutment surface the actuator having a pressure sheath which surrounds the wire, which is clamped between the fixed support and the abutment surface of the axial guide and which is adapted to transmit a compressive force in the axial direction.

6. The actuator according to claim 1, in which a return spring which is configured such that the actuating element can be moved against the action of the return spring from the first position into the second position, the return spring being designed as a compression spring.

7. The actuator according to claim 1, wherein the actuating element is provided with a through-opening for the wire, the wire extending through the through-opening with a clearance in the radial direction (R).

8. The actuator according to claim 1, wherein the connecting element has a connecting portion for electrical contacting.

9. The actuator according to claim 1, in which a heat insulating inner tube at least partially surrounding the wire.

10. The actuator according to claim 1, in which a housing for accommodating the actuating element or the floating support or the axial guide.

11. The actuator according to claim 10, wherein the return spring is arranged in the housing and is clamped between the axial guide and the actuating element.

12. The actuator according to claim 1, wherein the actuating element is provided with a receptacle for a Bowden cable which has an inner cable and a Bowden cable housing, the receptacle being configured to be connected to the inner cable in a form-fitting manner.

13. The actuator according to claim 12, in which a guide part for the Bowden cable which is fastened to the housing and has a through-opening for the inner cable and an stop surface for the Bowden cable housing, the guide part being provided with a groove into which at least one fixing projection engages in a form-fitting manner.

14. An adjustable component for a motor vehicle, comprising the actuator according to claim 1.

15. A method of connecting a wire, which has a diameter and extends in an axial direction, to a connecting element of the actuator of claim 1, the connecting element being elastically deformable in the axial direction, said connecting element having a receiving opening for the wire, which has a variable diameter and into which the wire is clampable, comprising the steps of:
  a) compressing in the axial direction in order to enlarge the receiving opening from a first diameter to a second diameter that is larger than the diameter of the wire;
  b) inserting the wire into the receiving opening when the second diameter of the receiving opening is reached;
  c) releasing tension of the connecting element in the axial direction in order to return the receiving opening from the second diameter to the first diameter.

16. A method of connecting a wire, which has a diameter and extends in an axial direction, to an elastically deformable connecting element of an of the actuator of claim 1, said connecting element having a receiving opening for the wire, which has a variable diameter and into which the wire is clampable, comprising the steps of:
  a) heating the to enlarge the receiving opening from a first diameter to a second diameter that is larger than the diameter of the wire;
  b) inserting the wire into the receiving opening when the second diameter of the receiving opening is reached;
  c) cooling the in order to return the receiving opening from the second diameter to the first diameter.

17. A connecting element for the wire, which is formed of a shape memory alloy, of the actuator of claim 1, comprising:
  a clamping wedge having a receiving opening for the wire extending in an axial direction and a lateral surface provided with at least one clamping portion;
  a sleeve which can be fitted onto the clamping wedge and which has a through-opening extending in the axial direction and an inner surface provided with at least one clamping portion, and
  a press bushing coupled to the clamping wedge and having a cavity receiving the wire and a wall plastically deformable in the radial direction (R) and provided with an inner surface;
  wherein by plastic deformation of the wall a first clamping force can be applied on the wire by plastic deformation of the wall on at least one retaining portion formed by the inner surface, the clamping force connecting the wire and the press bushing to one another in a force-locking manner, and
  wherein the clamping wedge and the sleeve can be braced against one another by a tensile force produced in the wire in the axial direction in such a way that a second clamping force can be applied to the wire in the receiving opening of the clamping wedge, the second clamping force additionally connecting the wire and the clamping wedge to one another in a force-locking manner.

18. The connecting element according to claim 17, wherein the clamping wedge has a front end face in the axial direction and is provided with at least one slot-shaped recess, the recess extending in the axial direction and opening at the front end face.

19. The connecting element according to claim 17, wherein the lateral surface of the clamping wedge has at least one clamping portion which tapers conically in the axial direction and/or at least one rectilinear clamping portion,
wherein preferably the inner surface of the sleeve has at least one clamping portion which tapers conically in the axial direction and/or at least one rectilinear clamping portion.

20. The connecting element according to claim 17, wherein the press bushing and the clamping wedge are integrally formed.

21. The connecting element according to claim 17, wherein the press bushing and the clamping wedge are formed as separate components,
  wherein the press bushing has a contact surface and the clamping wedge has a corresponding surface which abuts against the contact surface.

22. The connecting element according to claim 17, wherein the clamping wedge has a rear shoulder in the axial direction and in that the sleeve has a front end face in the axial direction and a rear end face in the axial direction,
  wherein the corresponding surface of the clamping wedge is formed by the shoulder.

23. The connecting element according to claim 22, wherein, when the sleeve is fitted on the clamping wedge, the shoulder of the clamping wedge and the rear end face of the sleeve are separated from one another by a distance.

24. The connecting element according to claim 22, wherein, when the sleeve is fitted on the clamping wedge, the front end face of the sleeve projects in the axial direction beyond the front end face of the clamping wedge, so that the inner surface of the sleeve forms a protrusion (b).

25. A method for connecting a wire having a diameter and extending in an axial direction to the connecting element according to claim 17 having a receiving opening for the wire in which the wire is clampable, comprising the following steps:
  a) by plastic deformation of the wall of the press bushing, a first clamping force is applied to the wire on at least one retaining portion formed by the inner surface, the first clamping force connecting the wire and the press bushing in a force-locking manner, and
  b) the clamping wedge and the sleeve are braced against one another by a tensile force generated in the wire in the axial direction in such a way that a second clamping force is applied to the wire in the receiving opening of the clamping wedge, the second clamping force additionally connecting the wire and the clamping wedge to one another in a force-locking manner.

* * * * *